United States Patent [19]

Bjorshol

[11] Patent Number: 4,641,452
[45] Date of Patent: Feb. 10, 1987

[54] APPARATUS FOR HOOKING AND POSSIBLY BAITING OF A FISHING LINE

[76] Inventor: Kolbjorn Bjorshol, N-6560 Langoyneset, Norway

[21] Appl. No.: 851,138
[22] PCT Filed: Jul. 26, 1985
[86] PCT No.: PCT/NO85/00044
  § 371 Date: Mar. 19, 1986
  § 102(e) Date: Mar. 19, 1986
[87] PCT Pub. No.: WO86/00783
  PCT Pub. Date: Feb. 13, 1986

[30] Foreign Application Priority Data

Jul. 30, 1984 [NO] Norway ............................ 843059

[51] Int. Cl.⁴ ................. A01K 83/00; A01K 91/04
[52] U.S. Cl. ........................................ 43/4; 43/27.4; 43/44.83
[58] Field of Search ................. 43/4, 4.5, 27.4, 44-83

[56] References Cited

U.S. PATENT DOCUMENTS

| | | | |
|---|---|---|---|
| 4,068,399 | 1/1978 | Björshol | 43/4.5 |
| 4,277,905 | 7/1981 | Huse | 43/44.83 |
| 4,407,087 | 10/1983 | Huse | 43/4 |
| 4,566,215 | 1/1986 | Bjorshol | 43/4 |
| 4,567,684 | 2/1986 | Bjorshol | 43/4 |

FOREIGN PATENT DOCUMENTS 143045 9/1980 Norway.

Primary Examiner—M. Jordan
Attorney, Agent, or Firm—Watson, Cole, Grindle & Watson

[57] ABSTRACT

An apparatus for hooking and possibly baiting of a fishing line which is provided with snoods (13), each snood having a head (8) adapted to be releasably connected to the neck of a fishing hook (7). The apparatus comprises a hook magazine (4) adapted for placing hooks in a stack and a pusher (6) for moving the hook (7) into engagement with the snood head (8). In order to retain snood heads (8) for coupling them to hook necks a stationary retainer element (9) and a cooperating movable retainer element (1) are provided, while a drive mechanism is provided for moving the movable retainer element in order to release the snood head after the pusher (6) has moved the hook neck into engagement with the snood head. One of the retainer elements (1;9) may have a recess (14) for placing of the snood heads (8), and the stationary retainer element (9) may be equipped with a protrusion (12) adapted to guide the snood heads (8) into the recess. Moreover, the apparatus may comprise a bait magazine (4) and a cutting knife (2) for bait.

11 Claims, 7 Drawing Figures

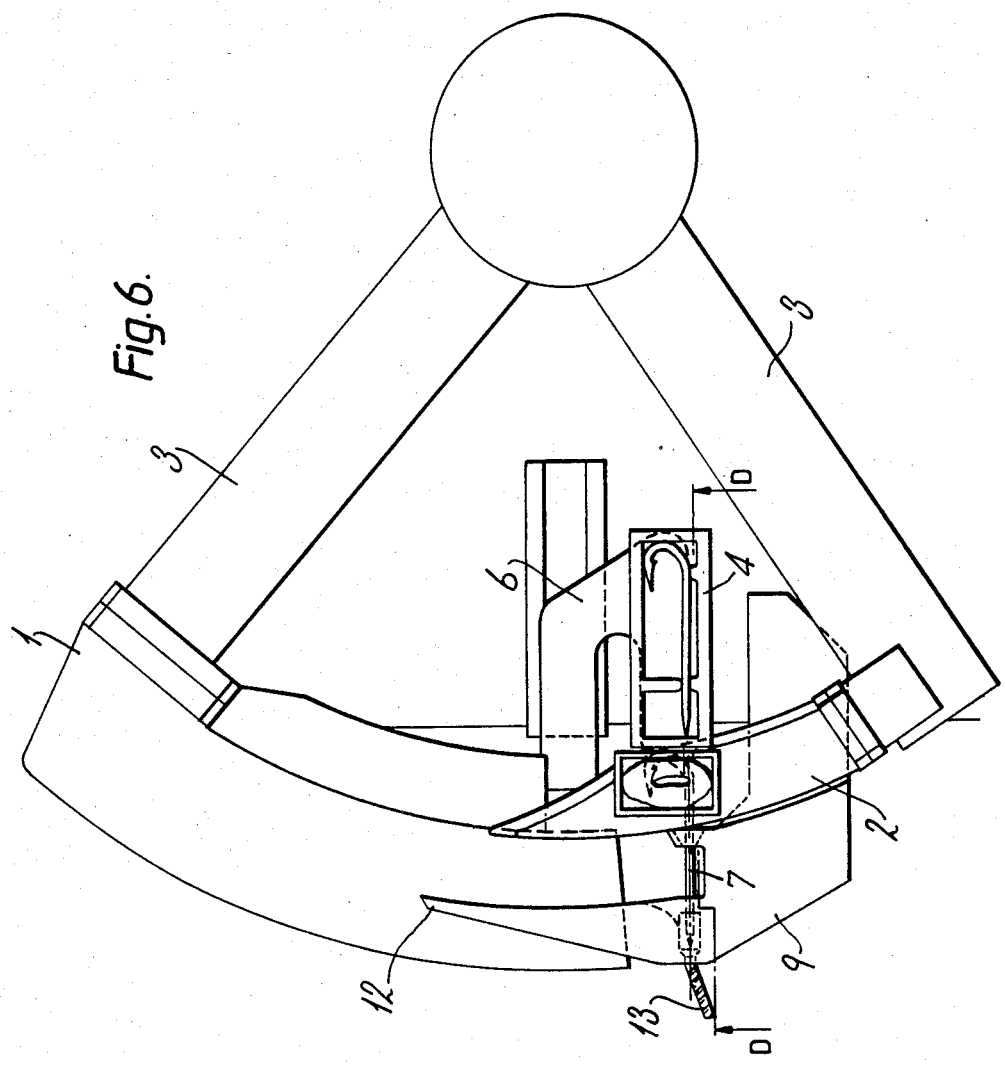

APPARATUS FOR HOOKING AND POSSIBLY BAITING OF A FISHING LINE

BACKGROUND OF THE INVENTION

Field of the Invention

The present invention relates to an apparatus for hooking and possibly baiting of a fishing line which is provided with snoods, each snood having a head adapted to be releasably connected to the neck of a fishing hook, the apparatus including a hook magazine for placing hooks in a stack and a pusher for moving the lowermost hook in the stack into engagement with a respective snood head.

The Prior Art

During line fishing it is an advantage to store a line which is not in use in a condition wherein the hooks are not mounted thereon. In this way entanglement of the hooks with each other, with the snoods, and with the line is avoided. It has, therefore, been previously suggested to equip the snoods with heads which permit releasable coupling to the necks of the fishing hooks. A snood head which can be used for this purpose is described in Norwegian Acceptance Print No. 146,935.

The hooking, and possibly the baiting, is preferably performed by use of an apparatus, such as that described in U.S. Pat. No. 4,567,684. The known apparatus comprises a turnable table on which is placed a hook magazine, and possibly a bait magazine, retainers for transitory retaining of snood heads, and possibly a cutting knife for bait. The snood heads are guided one by one in a circular path together with the table, and hooking is carried out automatically at the same time, possibly also baiting, in that the hooks are moved into engagement with snood heads and are possibly also baited by being moved through bait.

Summary of the Invention

The present invention provides an apparatus which carries out the same task, i.e., hooking, possibly combined with baiting, in such a manner that movement of the snood heads and their snoods in a circular path is avoided.

The apparatus in accordance with the invention includes a stationary hook magazine for placing the hooks in a stack, a pusher for moving the hooks into engagement with snood heads, a stationary retainer element, a movable retainer element which is cooperable with the stationary retainer element to retain the snood heads so that they can be connected to hook necks, and a drive mechanism for moving the movable retainer element to release the snood heads after the pusher has moved the hook necks into engagement with the snood heads.

When using an apparatus in accordance with the invention the snood heads are retained one by one by two cooperating retainer elements, one of which is stationary and the other of which is movable, and the retaining ceases automatically when a pusher has moved a hook into engagement with the snood head. Moreover, the apparatus may comprise a bait magazine provided between the hook magazine and the stationary retainer element, and a cutting knife which follows the movement of the movable retainer element in order to cut the bait.

The invention will hereinafter be explained in more detail with reference to the accompanying drawings, which show an embodiment of an apparatus in accordance with the invention. The drawings only show those parts of the apparatus which have a direct influence on the hooks, the bait and the snood heads, and the drive mechanism for movement of the parts has not been shown. The embodiment shown also performs baiting.

DESCRIPTION OF THE DRAWINGS

FIG. 6 shows a plan view of the apparatus, in a position where the lowermost retainer element has been moved away from the stationary retainer element, and the cutting knife has cut entirely through the bait, while the pusher has moved the hook into engagement with the snood head.

DETAILED DESCRIPTION OF THE PREFERRED EMBODIMENT

Figure 1:
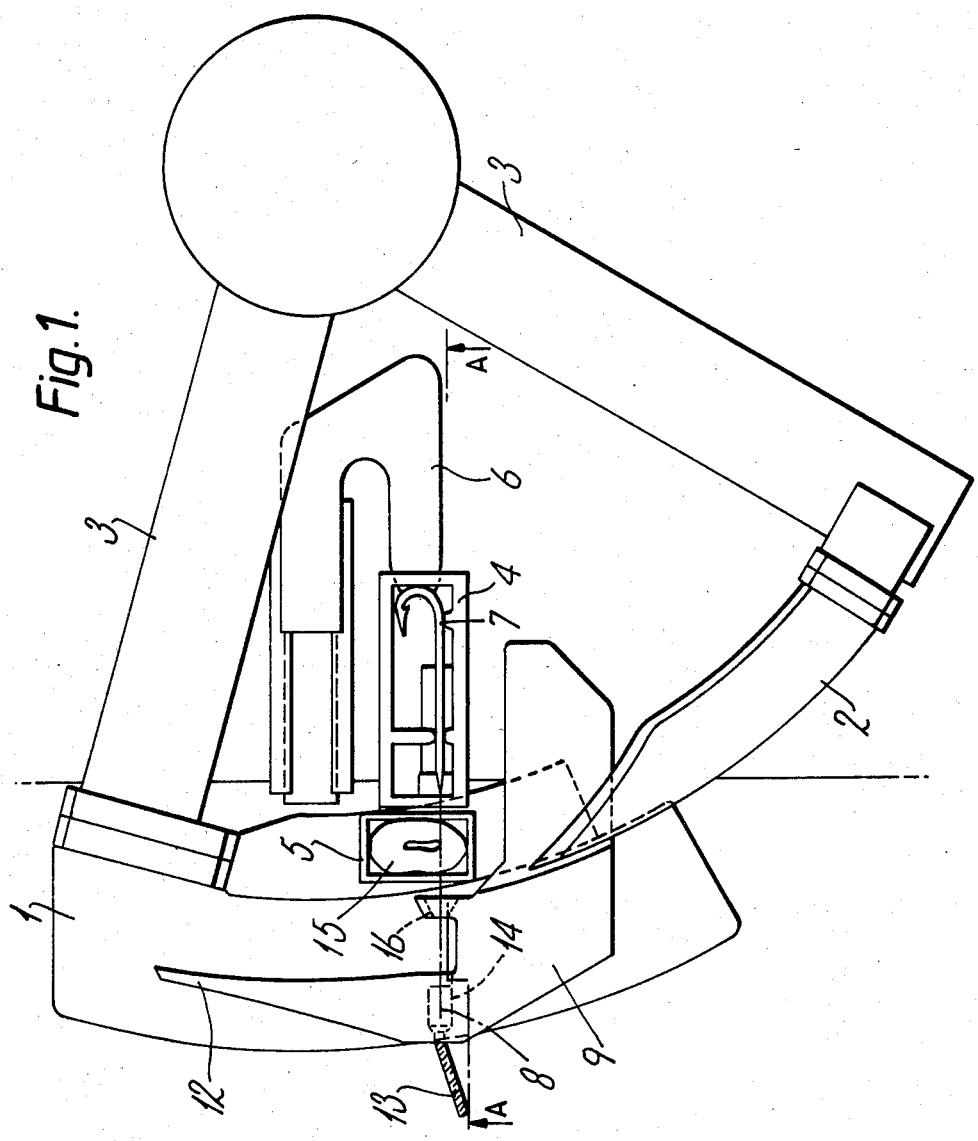
FIG. 1 shows a plan view of the apparatus in an initial position, whereby a snood head is situated between the retainer elements.

The apparatus shown in the drawings comprises a movable retainer element 1 fastened to an arm 3 in order to be able to pivot in a horizontal plane. The retainer element 1 cooperates with a stationary retainer element 9 having a recess 14 for placing of respective snood heads 8. In order to guide snood heads to the recess 14, the retainer element 9 has a protrusion 12. When a snood head 8 is situated inside of the protrusion 12, the corresponding snood 13 is guided in between the retainer elements 1 and 9 in such a manner that the snood head 8 is pulled into the recess 14 and is retained in a correct position for acceptance of the end of the neck of a hook.

Figure 2:
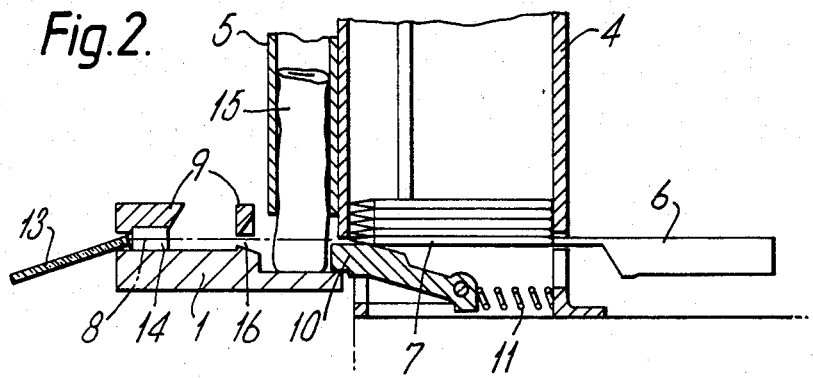
FIG. 2 shows a section along the line A—A in FIG. 1.
Figure 3:
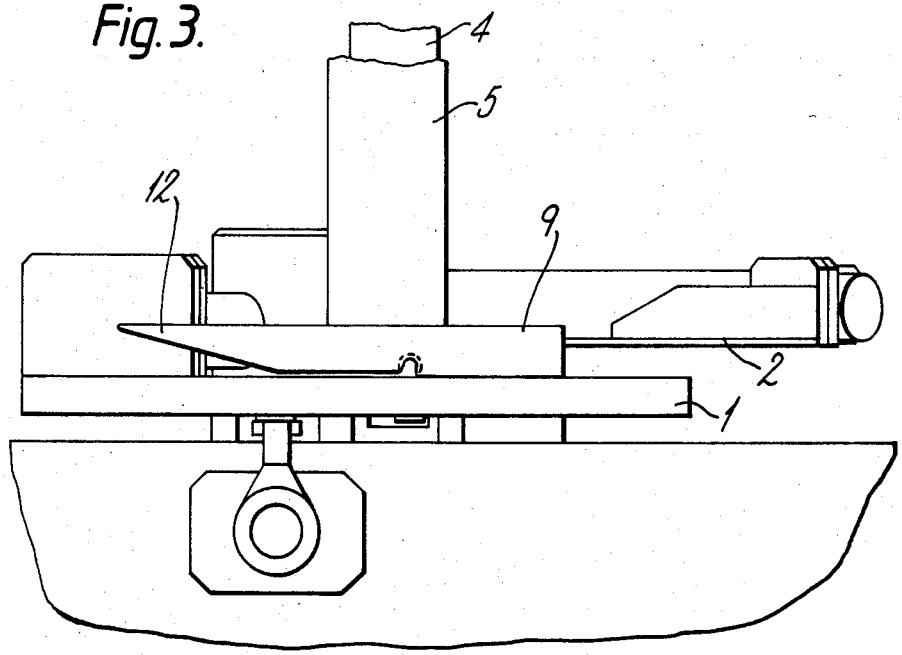
FIG. 3 shows the apparatus seen horizontally, in a direction towards the right in FIG. 1.
Figure 5:
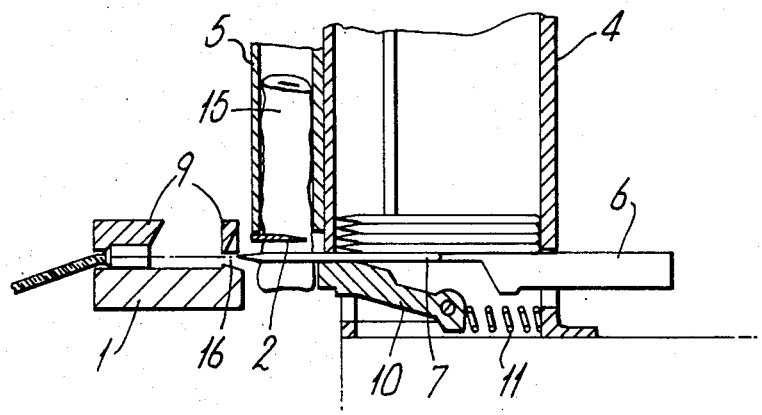
FIG. 5 shows a section along the line C—C in FIG. 4.
Figure 7:
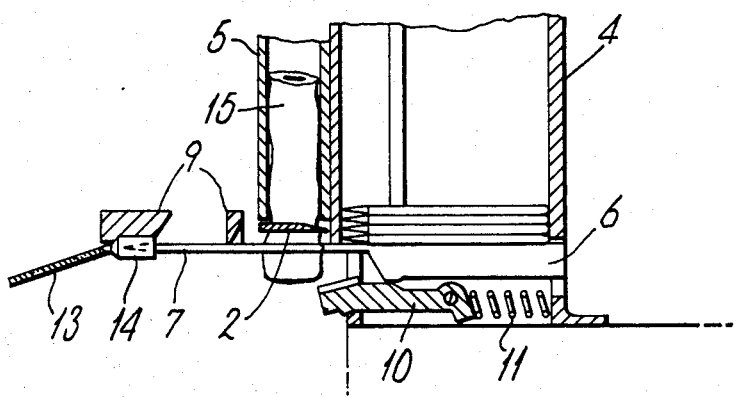
FIG. 7 shows a section along the line D—D- in FIG. 6.

As can be best seen in FIGS. 2, 5 and 7, hooks lie in a stack in the hook magazine 4. A movable pusher 6 is in its initial position, shown in FIG. 1, outside of the hook magazine 4, which has an aperture in one wall through which the pusher 6 can be moved. In the opposite wall the hook magazine 4 has another aperture through which the hooks can be moved out, one-by-one, by the pusher 6. The hooks lie inside the hook magazine 4 with their hook necks aligned with a hole in the snood head 8 in the recess 14 when the hooks are successively situated at the bottom of the stack.

Figure 4:
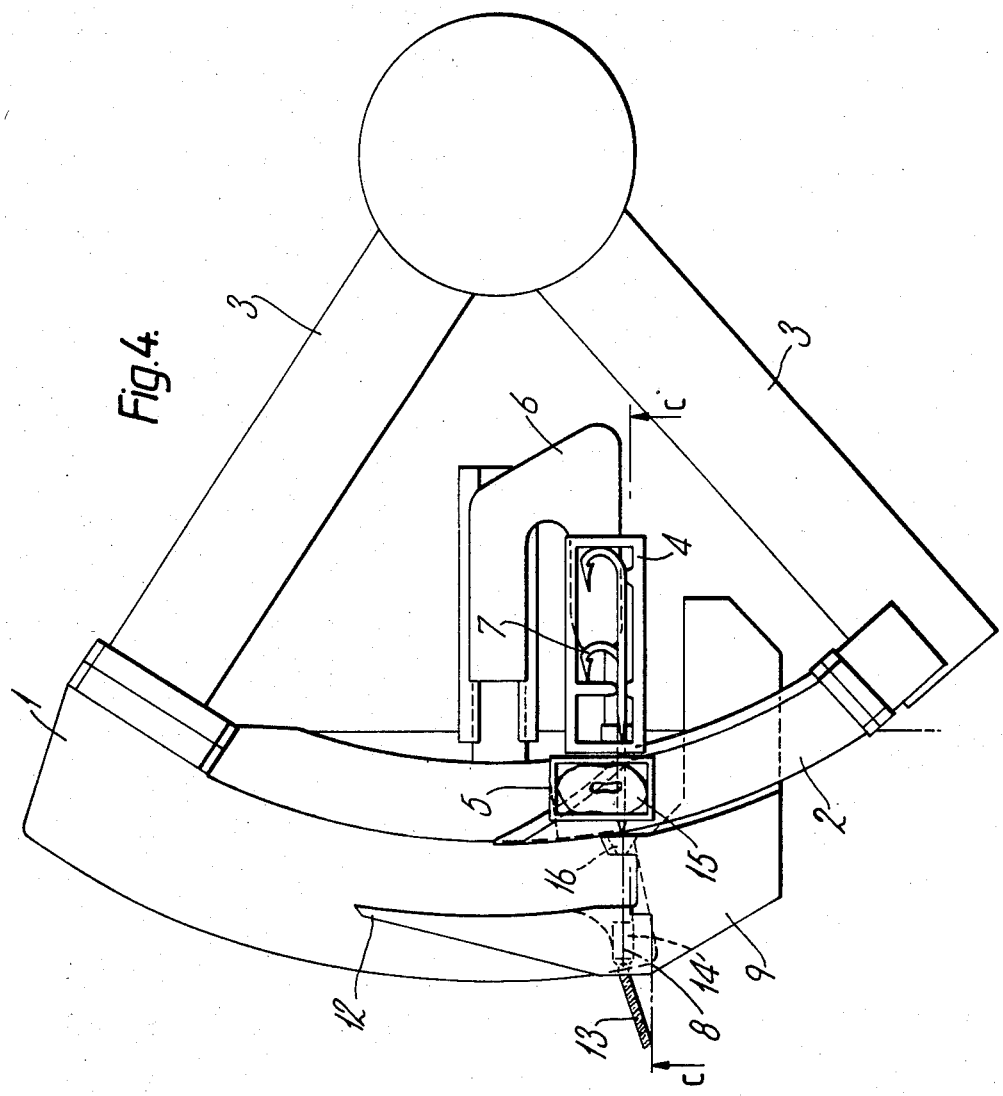
FIG. 4 shows a plan view of the apparatus, in a position where the lowermost retainer element has been moved slightly away from the initial position, and the cutting knife has started cutting the bait, while the pusher has started to move a hook towards the snood head.

The embodiment shown also comprises a bait magazine 5 containing bait 15. The bait magazine is situated between the hook magazine 4 and the stationary retainer element 9. A cutting knife 2 is provided in order to cut off a piece from the bait. The latter performs a pivotal movement in the horizontal plane together with the movable retainer element 1. As can be seen in FIG. 2, the movable retainer element 1 also forms support for the bait 15 in the bait magazine 5, until the movable retainer element has been moved away sufficiently to cause the supporting to cease, as shown in FIG. 4.

In the initial position, shown in FIGS. 1 and 2, a guiding lever 10 forms a lateral guide for the hook neck of the lowermost hook 7 in the hook magazine 4. In the position shown the guiding lever 10 is prevented from pivoting downwardly because it abuts a portion of the movable retainer element 1, which supports the bait 15. Moreover, the guiding lever 10 is biased by a spring 11 for pivotal movement in the upward direction. However, the supporting of the guiding lever 10 ceases when the retainer element 1 has moved to the position shown in FIGS. 4 and 5. In this position the hook neck of the hook 7 has been pushed through the piece of bait, which is nearly cut off by the cutting knife 2. The snood head 8 is still kept between the retainer elements 1 and 9 because the portion of the movable retainer element 1 situated below the snood head is elongate in the direction of movement.

The hooks in the hook magazine 4 are pushed with their hook necks into the snood heads 8 which are held in the recess 14. During the initial part of the movement of the lowermost hook 7 in the hook magazine 4, the hook is guided by the guiding lever 10. The guiding is subsequently taken over by an aperture 16 provided between the retainer elements 1 and 9. FIG. 5 shows a lowermost hook 7 immediately prior to entering the aperture 16, pushed by the pusher 6. In this position the hook is still guided also by the guiding lever 10, and the aperture 16 cooperates with the guiding lever 10 in order to keep the hook aligned with the snood head 8. When the hook 7 has entered the snood head 8, the retainer element 1 is moved so far that the portion of the retainer element which defines the aperture 16 is moved away from the corresponding portion of the retainer element 9, so that the hook 7 is released and may be removed together with the snood head 8 and the snood 13.

The formation of the aperture 16 takes place in the same manner as the formation of the recess 14 for the snood heads, and each snood head 8 is released simultaneously with the release from the aperture 16 of that hook which is connected to the snood head.

During the last part of the movement of the retainer element 1, the cutting knife 2 and the pusher 6 move to the position shown in FIGS. 6 and 7, and the pusher will force the the guiding lever 10 downwardly in order to provide space for the pusher 6, as can be seen in FIG. 7. The hook neck is pushed into the snood head 8, which is released because the retainer element 1 leaves the area below the snood head 8. The cutter knife 2 cuts entirely through the bait, and in the position shown in FIG. 6 and 7 the baited hook is ready to be removed from the apparatus together with the snood head 8 and the snood 13. After this removal, the cutting knife 2 makes a support for the remaining bait in the bait magazine 5. The retainer element 1, the cutting knife 2 and the pusher 6 are moved back to the initial position, and are ready for a new cycle. During this movement, the retainer element 1 will successively take over the supporting of the bait 15.

In the shown and described embodiment the retainer element 1 and the knife 2 are mounted for pivotal movement in the horizontal plane. It will be appreciated that the movement may be different, for instance a rectilinear movement. This may, for instance, be achieved when the retainer element 1 and the cutting knife 2 are mounted on slides or rollers on rails.

The positioning of the snood heads 8 inside of the protrusion 12 of the retainer element 9 may be carried out manually or by use of mechanical devices.

It will also appear that the apparatus may be used only for hooking, without baiting, whereby the baiting is carried out after the hooking. The hook magazine 4, the pusher 6 and the retainer elements 1 and 9 may in this case be provided as shown, with the exception that the portion of the retainer element 1 adapted to support the bait can be omitted.

In order to start the movement of the retainer element 1 and the pusher 6, and of a possible cutting knife for bait, a sensor (not shown) may be used for sending a signal to the drive mechanism.

Of course, the drive mechanism is designed in such a manner that the movement of the movable retainer element and of a possible cutting knife is adapted to the movement of the hook pusher. This can be achieved by a mechanism driven by a motor, and it is possible to use electric, pneumatic or hydraulic motors which are controlled according to per se known principles.

I claim:

1. An apparatus for hooking and possibly baiting of a fishing line provided with snoods, each snood having a head adapted to be releasably connected to the neck of a fishing hook, comprising a hook magazine for placing hooks in a stack, a pusher for moving the hooks into engagement with respective snood heads, a stationary retainer element (9) and a cooperating movable retainer element (1) for retaining snood heads (8) and for connecting them to hook necks, and a drive mechanism for moving the movable retainer element in order to release the snood heads after the pusher (6) has moved the hook necks into engagement with the respective snood heads.

2. An apparatus as claimed in claim 1, wherein one of the retainer elements (1;9) comprises a recess (14) for placing of the snood heads (8).

3. An apparatus as claimed in claim 2, wherein the stationary retainer element (9) includes a protrusion (12) for guiding the snood heads (8) into the recess.

4. An apparatus as claimed in claim 1, wherein the movable retainer element (1) has a portion located close to the stationary retainer element (9) prior to the starting of the movement of the movable retainer element and the pusher (6).

5. An apparatus as claimed in claim 1, including a sensor for detecting when a snood head (8) is being held by the two retainer elements (1;9), and for providing a signal to the drive mechanism to start the movement of the movable retainer element (1) and of a possible cutting knife (2) for bait.

6. An apparatus as claimed in claim 1, including a cutting knife (2) for movement together with the movable retainer element (1) in order to cut bait (15) located in a bait magazine (5) situated between the hook magazine (4) and the stationary retainer element (9).

7. An apparatus as claimed in claim 6, wherein the movable retainer element (1) is provided with an element for supporting the bait.

8. An apparatus as claimed in claim 1, wherein the movable retainer element (1), together with a possible cutting knife (2), is mounted pivotally in the horizontal plane.

9. An apparatus as claimed in claim 1, wherein the hook magazine (4) has a spring-biased guiding lever (10) for lateral guiding of the hook neck of the lowermost hook (7) in said magazine, and wherein the pusher (6) during the last part of its movement, in order to push the lowermost hook forward, surmounts the spring force and pushes the guiding lever (10) in a downward pivotal movement, driven by the drive mechanism.

10. An apparatus as claimed in claim 1, wherein portions of the two retainer elements (1;9) are adapted to, prior to the entering of the hook neck of a hook (7) in the recess (14), form a guide for the hook neck.

11. An apparatus as claimed in claim 10, wherein the portion of the movable retainer element (1) which defines an aperture (16) forming said guide is adapted to be moved away in order to release the hook neck when the latter has entered the snood head (8).

* * * * *